No. 737,375. PATENTED AUG. 25, 1903.
C. C. EGGERS.
AMUSEMENT APPARATUS.
APPLICATION FILED MAR. 25, 1903.
NO MODEL. 2 SHEETS—SHEET 1.
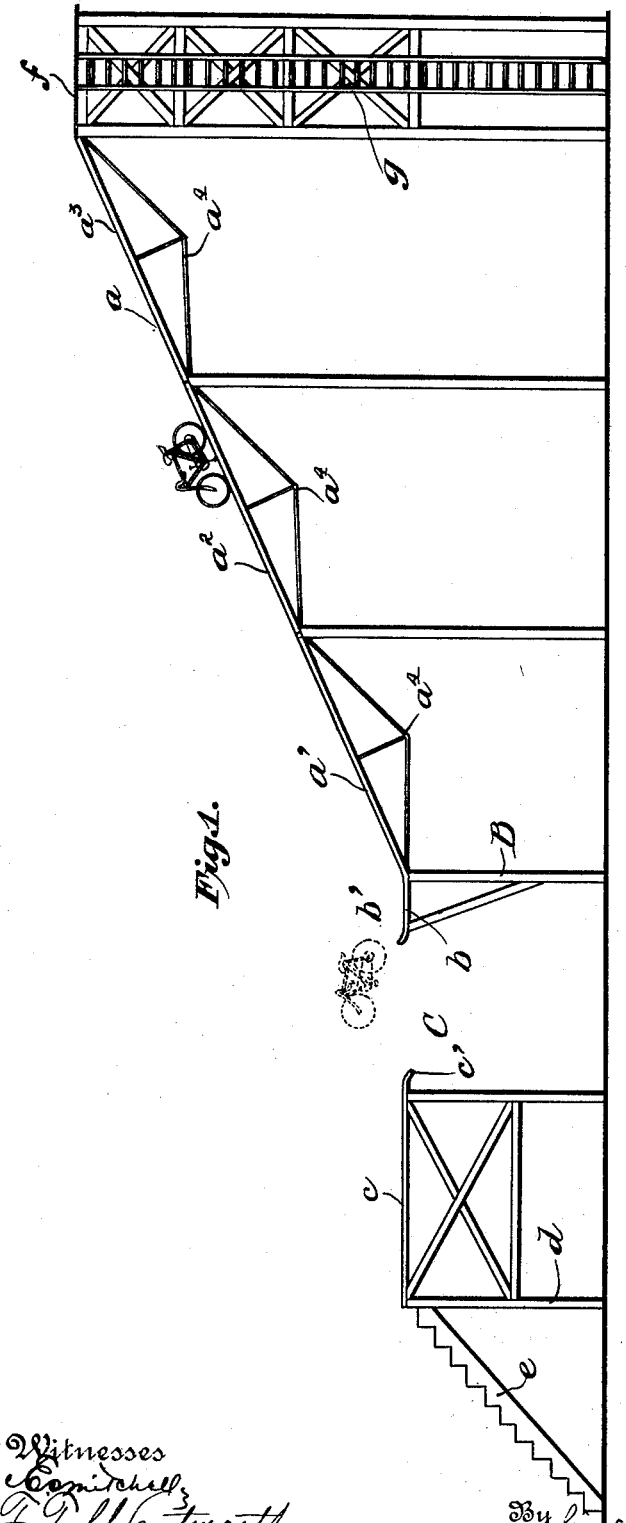
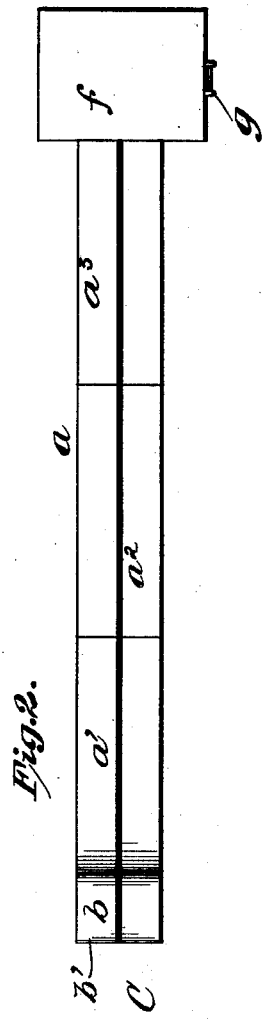
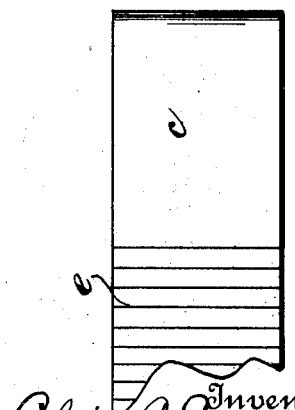

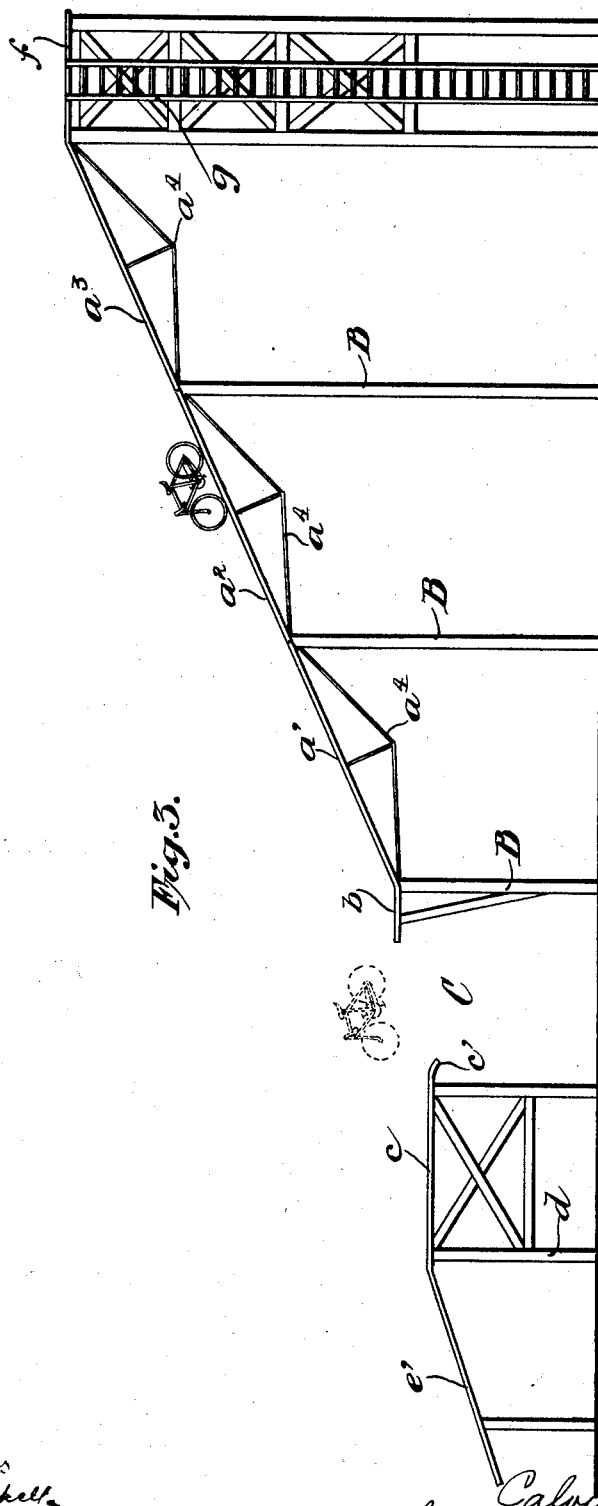

No. 737,375. Patented August 25, 1903.

UNITED STATES PATENT OFFICE.

CALVIN C. EGGERS, OF NEW YORK, N. Y., ASSIGNOR TO ARTHUR T. PRESCOTT, OF ARLINGTON, MASSACHUSETTS.

AMUSEMENT APPARATUS.

SPECIFICATION forming part of Letters Patent No. 737,375, dated August 25, 1903.

Application filed March 25, 1903. Serial No. 149,504. (No model.)

*To all whom it may concern:*

Be it known that I, CALVIN C. EGGERS, a citizen of the United States, residing at the borough of Brooklyn, city of New York, county of Kings, and State of New York, have invented certain new and useful Improvements in Amusement Apparatus, of which the following is a specification, reference being had therein to the accompanying drawings, which form a part thereof.

My invention relates to a class of amusement apparatus embodying a track structure adapted to be traversed by a vehicle or conveyance either wholly or partly under the influence of gravity.

The object of the invention is to provide an apparatus of this class which will be especially adapted for use by a person or persons in giving exhibitions of daring and skilful control of a vehicle or conveyance traveling at high speed.

A further object is to provide such an apparatus embodying a track structure having in its length a gap so disposed as to be necessarily jumped by the vehicle or conveyance to enable certain objects to be arranged therein in a manner to have the vehicle or conveyance pass thereover.

A still further object is to provide means on the far side of the gap to arrest the flight of said vehicle or conveyance in a manner to insure the safety of the rider or occupant.

A still further object is to provide an amusement apparatus wherein the vehicle or conveyance will be diverted from a horizontal course in passing over the gap and the objects therein; and a still further object is to provide an amusement apparatus of this type which, if desired, may be so constructed and arranged as to be portable to increase its field of utility for exhibition purposes.

The invention consists in an amusement apparatus comprising an elevated track structure adapted to be traversed by a vehicle or conveyance embodying therein a downward incline and a ledge extending at an obtuse angle from the lowest point of said incline and means for arresting the flight of a vehicle or conveyance after it has left said ledge, a gap being left between said ledge and said arresting means, and in such other novel features of construction and arrangements of parts as are hereinafter set forth and described, and more particularly pointed out in the claims hereto appended.

Referring to the drawings, Figure 1 is a side elevation of a portable track structure embodying my invention, a bicycle being shown as traversing the downward incline and indicated in dotted lines above the gap. Fig. 2 is a plan view of the structure shown in Fig. 1; and Fig. 3 is a side elevation of a modification of my invention, illustrating another manner in which the effects of gravity upon the vehicle or conveyance while passing over the gap may be compensated for.

Like letters refer to like parts throughout the several views.

In the accompanying drawings I have shown my invention as embodied in a structure particularly adapted to be traversed by a bicycle and rider.

A denotes a track structure elevated above the ground-level by any suitable means, as the series of supporting-uprights B. The track structure A embodies therein a downward incline $a$, extending at any angle required to develop sufficient speed of the bicycle, and at the lowest point of this incline I extend outwardly at an obtuse angle therefrom a ledge $b$, which serves to change the course of the vehicle or bicycle to project it across the gap hereinafter referred to. The point of joinder of the ledge $b$ and incline $a$ is arranged so as to not materially impede or rack the bicycle or jar the rider, as by the use of a curve at this point of large radius.

In the preferred form of my invention I provide the ledge $b$ with a lip $b'$, which is inclined slightly upward, so that the wheel on leaving the ledge will rise slightly in order that it may pass over objects extending slightly above the ledge $b$. Beyond this ledge $b$ is a gap C, and on the far side of this gap I provide means for arresting the flight of the bicycle under the force of the momentum acquired by its descent of the incline $a$. In the form shown this means comprises a platform $c$, raised to approximately the same elevation as the ledge $b$ by means of the supporting-uprights $d$. This platform $c$ is disposed opposite to the ledge $b$ and distant therefrom sufficiently to form a gap of the desired breadth and is preferably considerably wider than the incline $a$ to prevent the wheel through a slight deviation from a straight course from missing this platform and falling to the ground. In actual use safety-nets are also preferably so spread adjacent to this platform as to prevent such a mishap. To minimize the effects of the impact of the bicycle with, and as a safety-guard in case the momentum acquired is not sufficient to cause the bicycle to entirely clear the edge of, the platform, I preferably provide it with an overhanging downwardly-inclined portion or guard $c'$.

Suitable means, as the stairway $e$, Figs. 1 and 2, or the inclined way $e'$, Fig. 3, are preferably provided to permit the rider to leave the platform $c$ in a spectacular manner. If desired, however, these members may be entirely dispensed with, the platform $c$ being materially elongated and provided with means for stopping the wheel, or other expedients may be employed for this purpose.

At the top of the incline $a$ I provide a suitable starting-platform $f$, to which access may be had in any desired manner. I preferably employ a ladder $g$, secured to or forming a part of the supporting-framework of the track structure. When a bicycle is used, such an arrangement is feasible; but it is apparent that the type of vehicle or conveyance and the strains to which the structure is subjected will determine the construction and arrangement of the entire structure.

Preferably the track structure is composed of a plurality of separable sections in order that it may be knocked down to facilitate its transportation from place to place. The incline $a$ is shown as formed of the three independent sections $a'$ $a^2$ $a^3$, each provided with suitable braces $a^4$ to insure as rigid a track structure as possible, and thus avoid the effects of undue vibration while the bicycle is passing thereover. These sections may be attached to the supports B in any desired manner so long as the abutting ends thereof form a fairly tight joint.

In the modification shown in Fig. 3 the structure is substantially like that heretofore described except that the ledge $b$ extends on a substantially horizontal plane throughout, the platform $d$ being arranged on a lower plane than said ledge. The difference between these parts is such as will insure the bicycle alighting fairly upon the latter. While this structure will not positively cause the wheel and rider to rise in passing over the gap, still such an effect may be produced by the rider causing the wheel to jump when about to leave the ledge. This is only possible with the most skilful riders, however, using light wheels, and I prefer such a structure as is shown in Figs. 1 and 2. The incline $a$ and ledge $b$ present a flat surface, so that the rider may be free to control his wheel and to guide him in steering. These parts are preferably provided with a continuous stripe $h$, contrasting in color with the rest of the surface thereof.

In the use of the structure heretofore described the wheel is transported to the platform $f$ in any desired manner, and the rider and his helpers mount thereto by the ladder $g$. Suitable objects are then placed in the gap C, preferably elephants or other animals being used to create a greater interest in the act. The wheel and rider then descend the incline $a$, the velocity increasing until toward the bottom of the incline the wheel has acquired great momentum. When the wheel strikes the ledge $b$, its course is changed without materially affecting its speed, and as it leaves the ledge its course is directed slightly upward by the lip $b'$, so that it is possible to clear the backs of the elephants or other obstruction even if such extend noticeably above the level of said ledge $b$. After jumping the gap C the wheel alights upon the platform $c$, where it may either be entirely arrested or else permitted to depart over the stairway $e$ or inclined way $e'$. The said platform, if desired, may be moved in order to repeat the act with a gradually-increased gap C.

The mode of operation of the modification shown in Fig. 3 is substantially as heretofore described except in that it would require either that animals of a height no greater than the ledge $b$ be used or else that the rider should actually jump his wheel vertically just as it is about to leave the ledge.

The length and pitch of the incline $a$ must be such as will develop sufficient speed in the vehicle or conveyance to cause it to jump the gap C and will depend entirely upon the weight of the vehicle or conveyance, the structure of the track proper, and the breadth of the gap.

It is not my intention to limit the invention to the precise details of construction heretofore described, as it is obvious that such may be varied without departing from the spirit and scope of my invention.

Having described the invention, what I claim as new, and desire to have protected by Letters Patent, is—

1. An amusement apparatus comprising an elevated track structure embodying therein a downward incline and a ledge extending at an obtuse angle from the lowest point thereof adapted to be traversed by a vehicle or conveyance, and means for arresting the flight of a vehicle or conveyance after it has left said ledge, a gap being left between said ledge and said arresting means.

2. An amusement apparatus comprising an elevated track structure embodying therein a downward incline, a starting-platform at the top of said incline, means whereby access is had to said platform and a ledge extending at an obtuse angle from the lowest point of said incline adapted to be traversed by a vehicle or conveyance and means for arresting the flight of a vehicle or conveyance after it has left said ledge, a gap being left between said ledge and said arresting means.

3. An amusement apparatus comprising an elevated track structure embodying therein a downward incline, a ledge extending at an obtuse angle from the lowest point thereof and an upwardly-inclined lip on said ledge adapted to be traversed by a vehicle or conveyance, and means for arresting the flight of a vehicle or conveyance after it has left said lip, a gap being left between said lip and said arresting means.

4. An amusement apparatus comprising an elevated track structure embodying therein a downward incline and a ledge extending at an obtuse angle from the lowest point thereof adapted to be traversed by a vehicle or conveyance, and a platform disposed opposite to said ledge and distant therefrom sufficiently to leave a gap therebetween.

5. An amusement apparatus comprising an elevated track structure embodying therein a downward incline and a ledge extending at an obtuse angle from the lowest point thereof adapted to be traversed by a vehicle or conveyance, and a platform disposed opposite to said ledge and distant therefrom sufficiently to leave a gap therebetween, said platform being wider than said ledge.

6. An amusement apparatus comprising an elevated track structure embodying therein a downward incline and a ledge extending at an obtuse angle from the lowest point thereof adapted to be traversed by a vehicle or conveyance, a platform disposed opposite to said ledge and distant therefrom sufficiently to leave a gap therebetween, said platform being of greater width than said ledge, and an overhung inclined guard on the edge of said platform.

7. An amusement apparatus comprising an elevated track structure embodying therein a downward incline and a ledge extending at an obtuse angle from the lowest point thereof adapted to be traversed by a vehicle or conveyance, a platform disposed opposite to said ledge and distant therefrom sufficiently to leave a gap therebetween, and a way leading from said platform to the ground.

8. An amusement apparatus comprising a portable elevated track structure embodying therein a downward incline and a ledge extending at an obtuse angle from the lowest point thereof adapted to be traversed by a vehicle or conveyance, and means for arresting the flight of a vehicle or conveyance after it has left said ledge, a gap being left between said ledge and said arresting means.

9. An amusement apparatus comprising a portable elevated track structure consisting of a downward incline composed of a plurality of separable abutting sections, supports therefor and means for securing said sections to said supports, and a ledge extending at an obtuse angle from the lowest point of the lowest section of said incline adapted to be traversed by a vehicle or conveyance, and means for arresting the flight of a vehicle or conveyance after it has left said ledge, a gap being left between said ledge and said arresting means.

10. An amusement apparatus comprising a portable elevated track structure embodying therein a downward incline, a platform at the top of said incline, means where access is had to said platform, a ledge extending at an obtuse angle from the lowest point of said incline and an upwardly-inclined lip on said ledge, adapted to be traversed by a vehicle or conveyance and having a guide-stripe extending longitudinally of said incline, ledge and lip, a platform disposed opposite to said lip and distant therefrom sufficiently to leave a gap therebetween, said platform being of greater width than said ledge, an inclined overhung guard on the edge of said platform and a way leading from said platform to the ground.

In witness whereof I have hereunto affixed my signature, this 13th day of March, 1903, in the presence of two witnesses.

CALVIN C. EGGERS.

Witnesses:
GEORGE P. BRECKENRIDGE,
F. T. WENTWORTH.